US012182558B2

(12) United States Patent
Knight et al.

(10) Patent No.: US 12,182,558 B2
(45) Date of Patent: Dec. 31, 2024

(54) APPLICATION RENDERING PLATFORM

(71) Applicant: Vobo LLC, Portland, OR (US)

(72) Inventors: Jeremy Knight, Lake Oswego, OR (US); Peter Fyhrie, Beaverton, OR (US)

(73) Assignee: Vobo LLC, Portland, OR (US)

( * ) Notice: Subject to any disclaimer, the term of this patent is extended or adjusted under 35 U.S.C. 154(b) by 405 days.

(21) Appl. No.: 17/671,482

(22) Filed: Feb. 14, 2022

(65) Prior Publication Data

US 2022/0261232 A1 Aug. 18, 2022

Related U.S. Application Data

(60) Provisional application No. 63/149,183, filed on Feb. 12, 2021.

(51) Int. Cl.
*G06F 8/61* (2018.01)
*G06F 16/955* (2019.01)
*H04W 4/14* (2009.01)

(52) U.S. Cl.
CPC ........... *G06F 8/61* (2013.01); *G06F 16/955* (2019.01); *H04W 4/14* (2013.01)

(58) Field of Classification Search
None
See application file for complete search history.

(56) References Cited

U.S. PATENT DOCUMENTS

| | | | | |
|---|---|---|---|---|
| 8,997,038 B2* | 3/2015 | Bozek | ........................ | G06F 8/30 717/106 |
| 9,600,997 B1* | 3/2017 | Abrahams | .............. | G08B 21/10 |
| 11,265,365 B2* | 3/2022 | Hargrove | ................ | H04W 4/18 |
| 11,669,890 B2* | 6/2023 | Lurev | ..................... | G06F 9/547 717/172 |
| 2002/0164025 A1* | 11/2002 | Raiz | ..................... | G06F 21/1015 380/231 |
| 2013/0332899 A1* | 12/2013 | Stewart | ............... | G06F 9/44505 717/121 |
| 2014/0096025 A1* | 4/2014 | Mandel | ................... | H04L 67/02 715/739 |
| 2017/0228229 A1* | 8/2017 | Jain | ........................ | G16H 40/63 |

* cited by examiner

*Primary Examiner* — Marina Lee
(74) *Attorney, Agent, or Firm* — Benedict R. Dugan; Lowe Graham Jones PLLC

(57) ABSTRACT

An Application Rendering Platform ("ARP") is described. The platform facilitates application rendering, which is the ability of a single application to manifest multiple application behavior sets. The ARP may include Application Rendering Server and a client component, for example a Client Rendering Software. The Client Rendering Software is an Application designed such that its overall behavior, including its user interface components and its functionality, can be controlled dynamically by the Application Rendering Server component. A user ("owner") can access the ARP configure a unique Behavior Set to be manifested for their Registrants ("end users") alone. Such a Behavior Set includes, but is not limited to, such qualities as the application badge, the user interface, color scheme, the feature menu contents, the functionality set, the graphical imaging and layout and the feature naming and language used.

12 Claims, 5 Drawing Sheets

APPLICATION RENDERING PLATFORM

CROSS REFERENCE TO RELATED APPLICATIONS

This application claims the benefit of U.S. Provisional Application No. 63/149,183, titled "Application Rendering Platform," filed Feb. 12, 2021, the content of which is incorporated herein by reference in its entirety.

BACKGROUND

Technical Field

The present disclosure generally relates to the field of Application Software, more particularly, to Application Software development and deployment.

Description of the Related Art

It is very common for organizations of all types, influencers and celebrities to want to deploy a dedicated computing device executable protocol or algorithm, generally referred to herein as "Application" or "App", under their own brand and with their own desired features to engage with their community. Members of such a community are commonly called 'users', and are typically comprised of customers, members or followers.

Such organizations or individuals require their Application to support some subset of an unlimited variety of complex functions and services to better allow their users to benefit from whatever services or functions the organization wishes to offer to their users. Such desired functions and services might include, but are not limited to, the promotion and/or sale of products, the delivery of important information or entertainment, the collection of information from their users, the energizing of a political base or any other community membership, etc.

In order to make such an App available to their communities of users these organizations or individuals need to devote extensive monetary and human resources.

Such organizations or individuals need to employ specialist user interface designers to convert their concepts to a high-level design. Then they need to employ software design, information technology and development engineering resources to fulfil a variety of roles including, for example: creation of the Application software that will be downloaded and installed by their users; dealing with the complex rejection cycles imposed by the target device operating system vendors; designing and instantiating the server platforms as needed to support the features and functions that their Application is intended to manifest; maintaining their Application throughout its entire deployment and use lifecycle including bug-fixes and feature updates and wholesale re-writes as their needs evolve. In addition, such organizations or individuals need to establish and maintain development accounts with the software distribution platforms of the various Device operating system vendors including, but not limited to, Apple® 'App Store' and Google® 'Play Store'.

With conventional Applications, the owner organizations or individuals typically rely on their users to search and find their App, initiate its download to their Device and then engage with their App by opening it and stepping through whatever registration process has been designed and implemented for the App.

This then results in the need for a major marketing effort on the part of the organization or individual to drive its prospective community of users to undertake that adoption effort before they can become available to the engagement initiatives the organization or individual seeks to employ via their App.

The traditional Application design and deployment process has a number of disadvantages. Such disadvantages include but are not limited to, the following:

Functionality and user interface design time, expense and complexity.

Client/server software development engineering time, expense and complexity.

Cost and management effort to establish and maintain developer accounts (see above).

Ongoing software maintenance efforts to maintain compliance with ever changing regulations.

Ongoing software maintenance efforts to update and improve the App.

Repeated complex verification cycles to approve and release a new app.

Registrant effort to find, install and register with the App.

Proliferation of Apps on individual Devices.

Proliferation of Apps on the various app stores and App distribution websites.

Development cycles to modify or re-brand an App.

As a result of these, and other, deficiencies and inefficiencies such typical Application design, deployment and maintenance processes take a long time and are very expensive.

BRIEF SUMMARY

A system and associated method greatly reducing the elapsed time and expense required for an organization or individual, the "Application Owner", to provide their community of users with a custom-designed, unique and dedicated software application.

This invention achieves this improvement through a process we call Application Rendering. By Application Rendering we mean the ability of a single application to manifest multiple application behavior sets.

According to one embodiment, an Application Rendering Platform (in some places referred to as "ARP") includes a server component, for example, an Application Rendering Server and a client component, for example a Client Rendering Software.

In one aspect, the client component, the Client Rendering Software, is an Application designed such that its overall behavior, including its user interface components and its functionality, can be controlled dynamically by the Application Rendering Server component.

In one aspect, the server component of this invention, the Application Rendering Server, is designed such that Application Owners, through a suitable administrative interface, can configure a unique Behavior Set to be manifested for their Registrants ("end users") alone. Such a Behavior Set includes, but is not limited to, such qualities as the color scheme, the feature menu, the functionality set, the graphical imaging and layout and the feature naming and language used.

The term "Application Rendering" refers to a function where a single set of software modules and system elements of sufficient power and flexibility can manifest a multiplicity of discrete application Behavior Sets, each Behavior Set on behalf of a discrete Application Owner, where each Behavior Set would traditionally have required its own discrete set of software and system elements.

In one aspect, a Registrant using the Client Rendering Software may register with one or many Rendered Applications.

If the Registrant is registered with only one Rendered Application then when the Client Rendering Software is opened it will present the Behavior Set as configured by the App Owner of that Rendered Application.

If the Registrant is registered with many Rendered Applications then when the Client Rendering Software is opened it will present the various registered Rendered Applications so that the Registrant may select the Rendered Application with which they wish to interact at that time. In one embodiment, for example, such presentation of multiple Rendered Applications would take the form of a typical Application folder. Once the Registrant selects their desired Rendered Application the Client Rendering Software will manifest the Behavior Set as configured by the App Owner of that Rendered Application.

Embodiments of the present disclosure provide a solution that avoids the need for an App Owner to design, develop or maintain any software or to create any development accounts through which to publish their Application for upload and installation by their Registrants. Each App Owner is able to establish their desired unique Rendered Application Behavior Set independently of any other App Owners that may also be users of the same Application Rendering Platform. The App Owner can provide their own unique feature and function set to their own Registrant communities under their own branding without the expense, effort, and other deficiencies as described in the 'Description of the Related Art' section above, commensurate with deploying a traditional custom app of their own.

An example of a situation where an embodiment disclosed herein would benefit an App Owner or organization can be envisaged by considering a church denomination or a trade union. The church denomination includes 100 churches each with 300 congregants and the Trade Union includes 50 Lodges each with 1000 members. To deploy custom applications there would need to be 150 discrete Apps developed and deployed consuming years of elapsed time and many tens of thousands of dollars of capital expense. Using an embodiment of the present disclosure, there would be rapid deployment of all 150 Apps with great reduction in cost and complexity.

An organization or entity wishing to publish their own Rendered Application and make it available to a group of Registrants can simply sign-up as an App Owner on the Application Rendering Platform.

In some embodiments, in order to sign-up as an App Owner on the Application Rendering Platform an organization or entity would have to provide only very basic registration information. In one embodiment the App Owner would be required to supply only their email address, their name, their desired Rendered Application name and their phone number.

Once the App Owner signs up with the required information the ARS instantly instantiates and publishes a generic Rendered Application under the Rendered Application name provided.

The App Owner, or a consulting service agent, is then able to login to the ARS using their uniquely identifiable registration information, with potentially multi-factor authentication, and configure the desired branding, user interface and functionality for their new Rendered Application. In some embodiments, the Rendered Application configuration activity may be supported on the ARS using many different industry-standard approaches, all well known to those skilled in the relevant arts.

Instantiating a Rendered Application using the Application Rendering Platform that is disclosed herein would allow an App Owner to publish a Rendered Application for their Registrants within a short time, for example a few minutes of their initial decision to do so, at a fraction of the conventional financial cost and with little to no requirement for development accounts, operational infrastructure or technical or operational personnel.

In some embodiments, registrants are able to install and register with the new App Owner's Rendered Application immediately after the App Owner has registered on the Application Rendering Platform.

In order to provide a virtually unlimited range of higher level functionality in some embodiments, the Application Rendering Platform includes an 'Application Programming Interface' (commonly referred to within the software development industry as an 'API' and well understood by those skilled in the relevant arts) to which suitably authorized third-party applications are able to connect to allow interaction with the App Owner's Rendered Application. Such third-party software applications can be operable to read, write and synchronize with the Application Rendering Platform's Database in order to, for example, control Rendered Application behavior, communicate with Registrants and drive further Rendered Application functionality on behalf of any App Owner.

DETAILED DESCRIPTION

Figure 1:
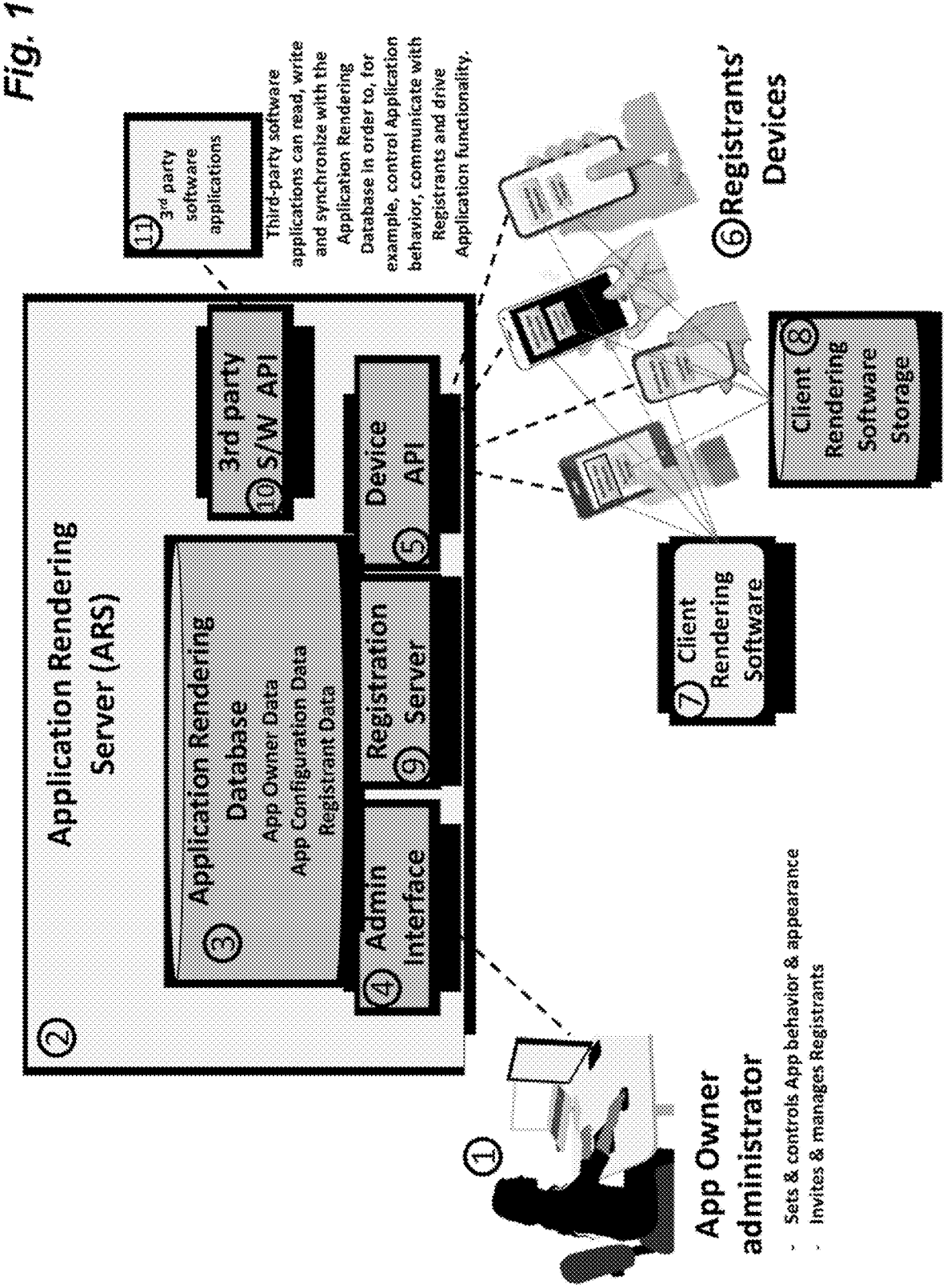
FIG. 1 is a schematic of high-level architecture of an Application Rendering Platform according to one embodiment.

As used herein, the following capitalized terms are defined as follows.

Device: Within this disclosure we use the capitalized term 'Device' as a noun to refer to a computing platform with an operating system suitable for the installation and use of Applications. Such Devices include, but are not limited to, mobile devices such as iPhones®, iPads® and Mac® computers, Android® devices such as smartphones and tablet computers and other laptop and desktop computing devices.

Application or App: Within this disclosure we use the capitalized term 'Application' or 'App' as a noun to refer to a computing device executable protocol, algorithm, software, or program, and/or collection of software combined into an object code module that can be installed within or accessed externally, and/or executable by, a computing system device's operating system environment such that a user or operator of that device can access, invoke and use the functions and features that that application is designed to deliver.

Behavior Set: Within this disclosure we use the capitalized term 'Behavior Set' as a noun to refer to a discrete definition of some or all aspects of an Application's user interface, features and functions accessible to the user through their interaction with that user interface.

Rendered Application: Within this disclosure we use the capitalized term 'Rendered Application' as a noun to refer to a specific 'Behavior Set' defined by an App Owner, that is stored in an Application Rendering Database, and that will be manifested by a 'Client Rendering Software' to its Registrants.

Client Rendering Software: Within this disclosure we use the capitalized term 'Client Rendering Software' as a noun to refer to a collection of software that when installed on a Registrant's computing system device can manifest any Rendered Applications to which the Registrant is registered.

Registrant: Within this disclosure we use the capitalized term 'Registrant' or 'Registrants' as a noun to refer to one or more individuals, users, and/or organizations that have downloaded and installed Client Rendering Software on their Device and have registered with one or many Rendered Applications. In various embodiments, Registrants may include, but are not limited to, the following examples: Customers of a commercial corporation; members of a club or union; followers or fans of an influencer or celebrity; subscribers to a service; students of an institution of learning; members of a church community.

Application Owner: Within this disclosure we use the capitalized term 'Application Owner' or 'App Owner' as a noun to refer to an individual, a group of individuals or an entity that control the availability of a Rendered Application and the functionality that it offers to its Registrants. Such Application Owners may include, but are not limited to, the following examples: a commercial corporation; a club or union; an influencer or celebrity; the operator of a service; an institution of learning; a church or faith-based community.

Application Rendering Server: in the present disclosure, an Application Rendering Platform includes a client/server architecture. The client components we refer to collectively as the 'Client Rendering Software' defined above. When referring to the server components, we use the capitalized term 'Application Rendering Server' or a shortened form 'ARS'.

URL: means uniform resource locator.

QRCode: means a machine-readable optical label that provides rapid access to a URL via a device camera.

Application Rendering Server (FIG. 1)

According to one embodiment, as shown in FIG. 1, an Application Rendering Platform includes an Application Rendering Server 2 such as a collection of software and database elements operable to perform a number of functions discussed in greater detail below including, but not limited to, the following:

Storage of all data required to discretely identify and manage permissions of subscribing App Owners and their Rendered Applications. The App Owner data in one aspect is used to police the access authority of App Owners to allow them access to manage their Registrants and modify their Rendered Application configuration data.

Storage of Behavior Sets as configured and updated by their Application Owners.

Invitation, registration and management data for Registrants and their Devices

According to some embodiments, the Application Rendering Server includes an Admin Interface 4. In one embodiment, an App Owner administrator 1 can be a person but may also, in certain embodiments, be an application, who or which can perform a number of operational and management functions as administrators of their Rendered Application.

The App Owner administrator 1 can access the administrative interface 4 of the Application Rendering Server 2 typically but not exclusively using a standard browser and standard authentication protocols, such access methods being well understood by those skilled in the relevant art.

The App Owner Administrator 1 via the admin interface 4 can configure the Behavior Set for their Rendered Application. The Behavior Set as entered by the App Owner administrator 1 is stored in the Application Rendering Database 3 by the ARS 2.

In one aspect, the Behavior Set can include, but is not limited to, one or more of the following:

Selection of color schemes, brand naming, imaging, and layout

Selection of which function or functions will be presented on the 'home' page. The 'home' page being the interface presented by the Rendered Application when it first opens and to which it will finally return when the Registrant 'backs' out of all the other functions.

Selection of Rendered Application functions to be made available to Registrants and the names of the icons, buttons or menu items and their positions within the Rendered Application's user interface that the Registrants will use to invoke these functions.

Configuration of http or https links that the Rendered Application presents to the Registrants, including locations, titles, descriptions, ordering, grouping and images.

Selection of options including layout, text, graphics and color schemes for the pages presented by the Rendered Application to make the selected functions available for the Registrant Selection of unique application badge image to be displayed in the application folder of the Registrant's Device Selection of unique Client Rendering Software publishing locations. (Client Rendering Software although common to all Rendered Apps may be published in different digital locations)

Client Rendering Software (Device Software) (FIG. 1—Items 7 & 8)

In one embodiment, the Application Rendering Platform includes a Client Rendering Software 7 accessible on the Registrants' Devices 6, for example installed thereon or remotely accessible, is configured or designed to manifest the Behavior Sets of any number of Rendered Applications.

In one embodiment, Rendered Applications (customized or named Behavior Sets) are maintained in the Application Rendering Database 3 by their App Owners 1.

The Client Rendering Software 7 in one aspect allows Registrants, via their devices 6, to register with any number of Rendered Applications. The registration process is part of the Behavior Set defined by the App Owner 1 for their Rendered Application.

Once a Registrant has registered with a Rendered Application, they can then use that Rendered Application according to their devices' operating system and Application launch and operation protocols.

In one embodiment, the Client Rendering Software 7 presents Rendered Applications to Registrant's Devices 6. Those with which a Registrant (a user of a corresponding Registrant Device 6) has registered are presented for selection for use or for de-registration. Those with which the Registrant has not registered may be presented for Registration. In one embodiment, for example, these Rendered Applications are presented graphically for selection in a traditional application folder format.

In one embodiment, the Client Rendering Software 7 modifies its behavior according to the Behavior Set of the Rendered Application selected for use by the Registrant Device 6.

In one embodiment, the Client Rendering Software 7 presents itself, in the application folder of the Registrant's Device 6, with an application badge unique to the selected Rendered Application that is dynamically selected by the Client Rendering Software 7 according to the Behavior Set active at any given time. In order to effect such a dynamic change to the application badge the App Owner 1 uploads their desired badge image to the App Configuration Data of the Application Rendering Database 3. The dynamic presentation of the App Owner's 1 desired application badge image will not thereafter occur until the Client Rendering Software 7 is itself upgraded to include the desired application badge image and released via the App Download Server 22. The Client Rendering Software 7 will include all dynamic application badge images for all Rendered Applications for which the respective App Owners 1 have selected a dynamic app badge image. Thereafter whenever a Registrant operates a Device 6 to select a Rendered Application the Client Rendering Software 7 will dynamically change its application badge to the image selected by the associated App Owner 1.

In one embodiment, the Application Rendering Server includes a Device API 5, and the Client Rendering Software 7 accesses and updates the Rendered Application Behavior Sets by querying the Application Rendering Database 3 via the Device API 5. Behavior Sets are also partially stored in the Client Rendering Software Storage 8 to reduce network dependency and load during operation.

Figure 2:
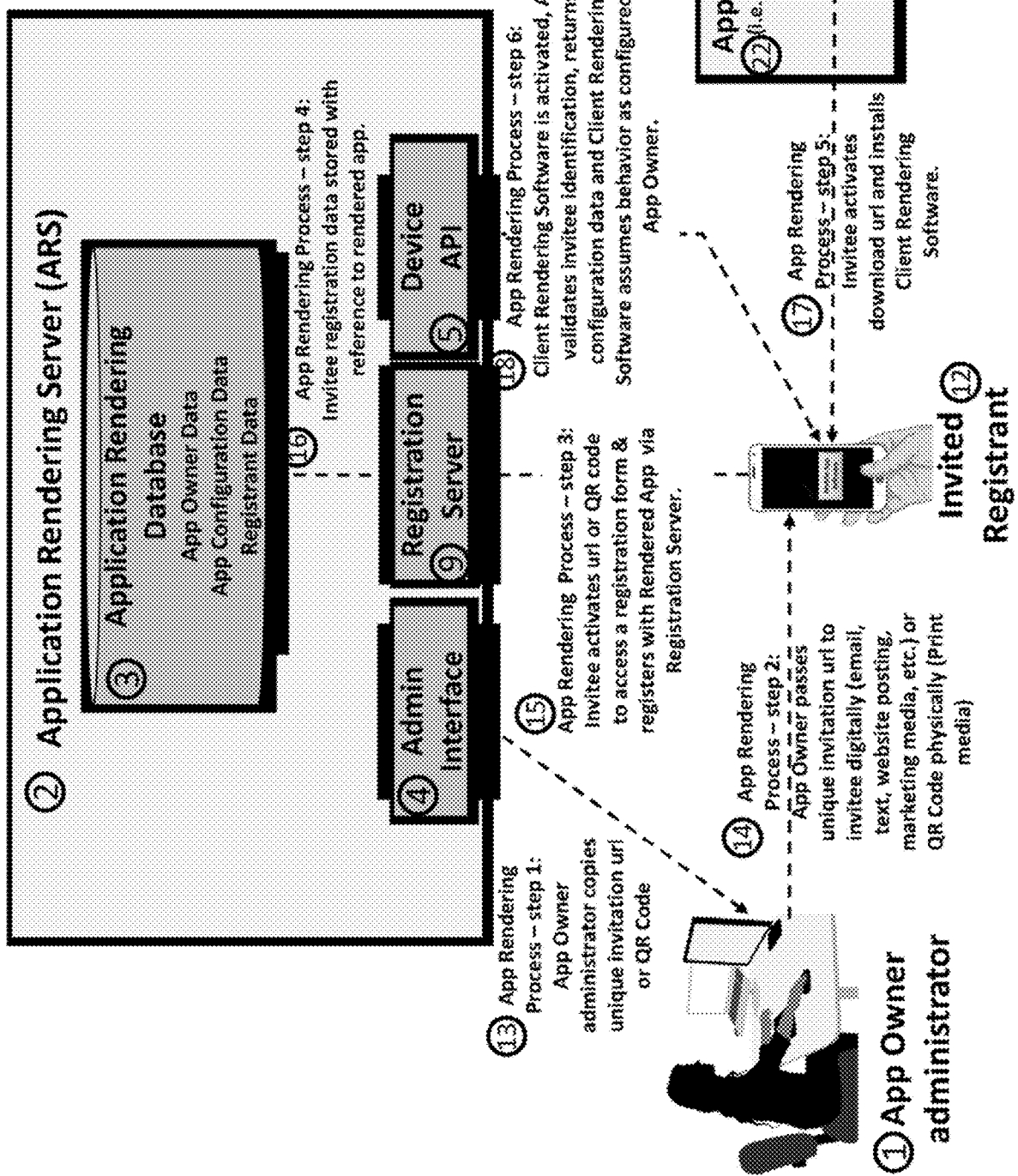
FIG. 2 is a schematic of a Process of Registrant Registration & Application Rendering of an Application Rendering Platform based on a Unique URL, according to one embodiment.

Application Registration and Rendering Process Based on a Unique Invitation URL (FIG. 2)

Referring now to FIG. 2, in one embodiment, the Application Rendering Server 2 includes a Registration Server 9. In one aspect, a process is described by which the Client Rendering Software 7 of an invited Registrant 12 assumes the Behavior Set configured by the inviting App Owner 1 without the need for the Invited Registrant 12 to select the Rendered Application with which they are being invited to register.

In one aspect, the manifesting of a Rendered Application, an assumption of behaviors specifically desired by the App Owner 1, is triggered first by the registration of a Registrant 12 who has the Client Rendering Software 7 installed or otherwise accessible and executable and activated on a Device 6. In one aspect, once a Registrant 12 registers with more than one Rendered Application, then Application Rendering can be triggered either by a new registration to an additional Rendered Application or simply by the selection of a Rendered Application with which the Registrant 12 is already registered.

In one embodiment, a Registration and Application Rendering Process includes a first step 13: The App Owner administrator 1, via the admin interface 4, copies a unique invitation URL and/or a scannable/readable code (e.g., QRCode, barcode) that is provided by the Application Rendering Server 2. This provided URL or scannable code embodies the address of the Registration Server 9 and can contain additional parameters that identify a specific Rendered Application to which the App Owner wishes to invite the Registrant. A person of skill in the art will understand that there are a number of methods of adding processing or routing information to the pure addressing fields of a standard URL. The present disclosure is not limited to use of any one of such methods, and any of such methods could be used here.

In one aspect, the Registration and Application Rendering Process includes a second step 14: The App Owner administrator 1 provides an invitational URL or scannable code to their intended Registrant communities via any communications method they choose, including but not limited to, email, text message, display on promotional material, written or spoken means. Invited Registrant 12, constitutes or is a member of one of said intended registrant communities.

In one aspect, the Registration and Application Rendering Process includes or enables a third step 15: The invited Registrant 12, using a standard browser or similar server access method, activates the invitational URL provided by the App Owner. The Registration Server 9 presents a registration form to the invited registrant 12 that requires at least one piece of identifying information such as, but not limited to, a phone number or an email address. In some embodiments, the registration form can optionally include additional fields and functions as configured by App Owner 1 such as, for example but not limited to, a security code to prevent unauthorized or unwelcome individuals from registering their Devices with the Application.

In one aspect, the Registration and Application Rendering Process includes or enables a fourth step 16: The captured information, that uniquely identifies the invited Registrant 12, can be stored in the Application Rendering Database 3 and is associated with the inviting App Owner 1. This identification information might include, but is not limited to, the invited Registrant's 12 email or phone number.

In one aspect, the Registration and Rendering Process includes or enables a fifth step 17: The Registration Server 9, once the invited registrant 12 has provided all required information, displays, or activates, a link to the download server from which the Registrant downloads and installs the Application Rendering Software 7. Depending on the embodiment there can be different links for different Device operating systems selectable by the invited Registrant 12 or it can be a dynamic link that addresses the appropriate download server 22 depending on the operating system of the Device of the Invited Registrant 12. Once the Application Rendering Software 7 is downloaded to the invited Registrant's Device the Invited Registrant 12 installs the Application Rendering Software 7 on their device.

For Invited Registrants 12 who have previously installed the Application Rendering Software 7 there is no need to install another copy. In some embodiments, the Application Rendering Software 7 is capable of manifesting a multiplicity of different Behavior Sets. Different embodiments of this invention may deal with invited Registrants who have the Application Rendering Software 7 already installed in many methods including but not limited to:

- Alerting the invited registrant 12, in writing or aurally, only to select the download URL if they have not already installed the Application Rendering Software 7.
- Allowing the download server to offer either a 'Get' or 'Download' when the app is not already installed and offering an 'Open' when it is already present.
- Using a 'Dynamic' link that automatically opens the Application Rendering Software 7 if it is present and if not automatically directs the invited Registrant to the appropriate download server for the Operating System on the Invited Registrant's 12 Device.

In one aspect, the Registration and Application Rendering Process includes or enables a sixth step 18: The Client Rendering Software 7, once installed on the Device 6 (see FIG. 1) of Invited Registrant 12, is activated either manually by the invited Registrant 12 or automatically upon installation by the Dynamic link process. Once activated the Client Rendering Software 7 requires the Registrant 12 to identify themselves by providing a piece of identification data captured or created during the app rendering process step 3. The invited Registrant's 12 identification data (for example phone number or email address) is provided or communicated to the Application Rendering Server 2 via the Device API 5.

The Application Rendering Server 2 then performs a validation of the identification data using an industry-standard process. Such a process, for example, might be the transmission of a 'one time password' via email to the email address or via SMS text to the phone number. Once received the Invited Registrant 12 keys in the 'one time password' to the Application Rendering Software 7 thereby proving they are indeed the same individual who identified themselves to the Registration Server 9 in Registration & Application Rendering Process—third step above. Any validation method that proves the device engaging in the Registration and Application Rendering Process in the sixth step matches the Registrant that registered in Registration and Application Rendering Process in the third step may be used and those skilled in the art may employ their preferred validation method.

In one aspect, the Device API 5 queries the App Owner data stored within the Application Rendering Database with the invitee identification data. If there is no match the Application Rendering Software 7 will either A) alert the Invited Registrant that no match has been found for their identifying data and offer them an opportunity to cancel registration or re-enter their identification data and retry; or B) The Device API 5 will provide the invited Registrant 12 a list of all Rendered Applications from which to choose the one they wish to register with. Registration with Rendered Applications may be secured for example by requiring a Security Access Code as described above.

Once registration is complete, in one aspect, the Device API 5 can transmit or electronically communicate to the Application Rendering Software 7 all Rendered Application Configuration data as entered and modified by the App Owner administrator 1. The Application Rendering Software 7 will write that configuration data to its local storage on the Invited Registrant's 12 Device and will embody the Behavior Set as defined by the Application configuration data.

Figure 3:
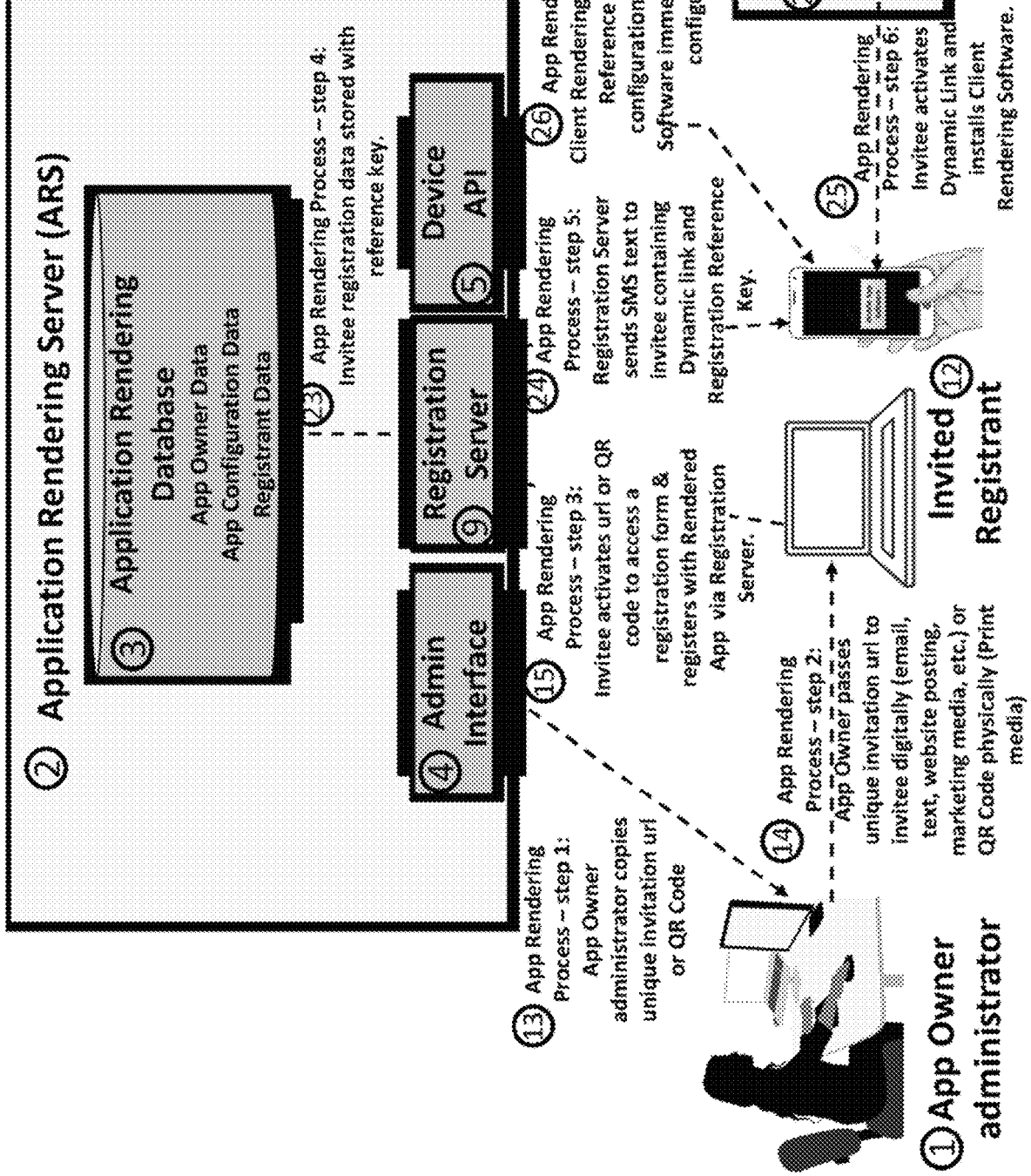
FIG. 3 is a schematic of a Process of Registrant Registration & Application Rendering of an Application Rendering Platform based on a Unique URL and including a dynamic link and a registration reference key, according to one embodiment.

Advanced Application Registration and Rendering Process Based on a Unique Invitation URL and Dynamic Link with Registration Reference Key (FIG. 3)

Referring now to FIG. 3, according to one embodiment, an advanced process is described which improves on the process described above and in FIG. 2 in the following ways:

1) In the fourth step 23 of the registration process, the captured information that uniquely identifies the invited Registrant 12 includes an identifying Registration Reference Key whose validity expires in some relatively short time period to enhance registration security.

2) In the fifth step 24 the Registration Server transmits an SMS text message to the Invited Registrant thereby validating their entered mobile device number.

3) In the fifth step 24 the Registration Server transmits an SMS text message to the Invited Registrant including a dynamic link to the App Download Server appropriate to the operating system of Invited Registrant's Device 6 and also as specified in the App Configuration Data as stored in the Application Rendering Database 3 by the App Owner 1.

4) In the fifth step 24 the dynamic link passed to the Invited Registrant's Device 6 in the SMS text as described above includes a method whereby the Client Rendering Software 7 once first activated can access the identifying Registration Reference Key stored with the registration data of the Invited Registrant 12 in step four 23. There are a variety of methods that can be used to effect this transfer of the identifying Registration Reference Key to the Client Rendering Software 7 that are known to those skilled in the relevant art.

5) In the seventh step 26 of the App Rendering Process the Client Rendering Software 7 submits the identifying Registration Reference Key to the Device API 5. The Device API 5 interrogates the Application Rendering Database 3 with the identifying Registration Reference Key and relays the correlated Invitee Registration Data and Application Configuration Data to the Client Rendering Software 7. The Client Rendering Software 7 then immediately manifests the required behavior as configured by the App Owner 1.

Figure 4:
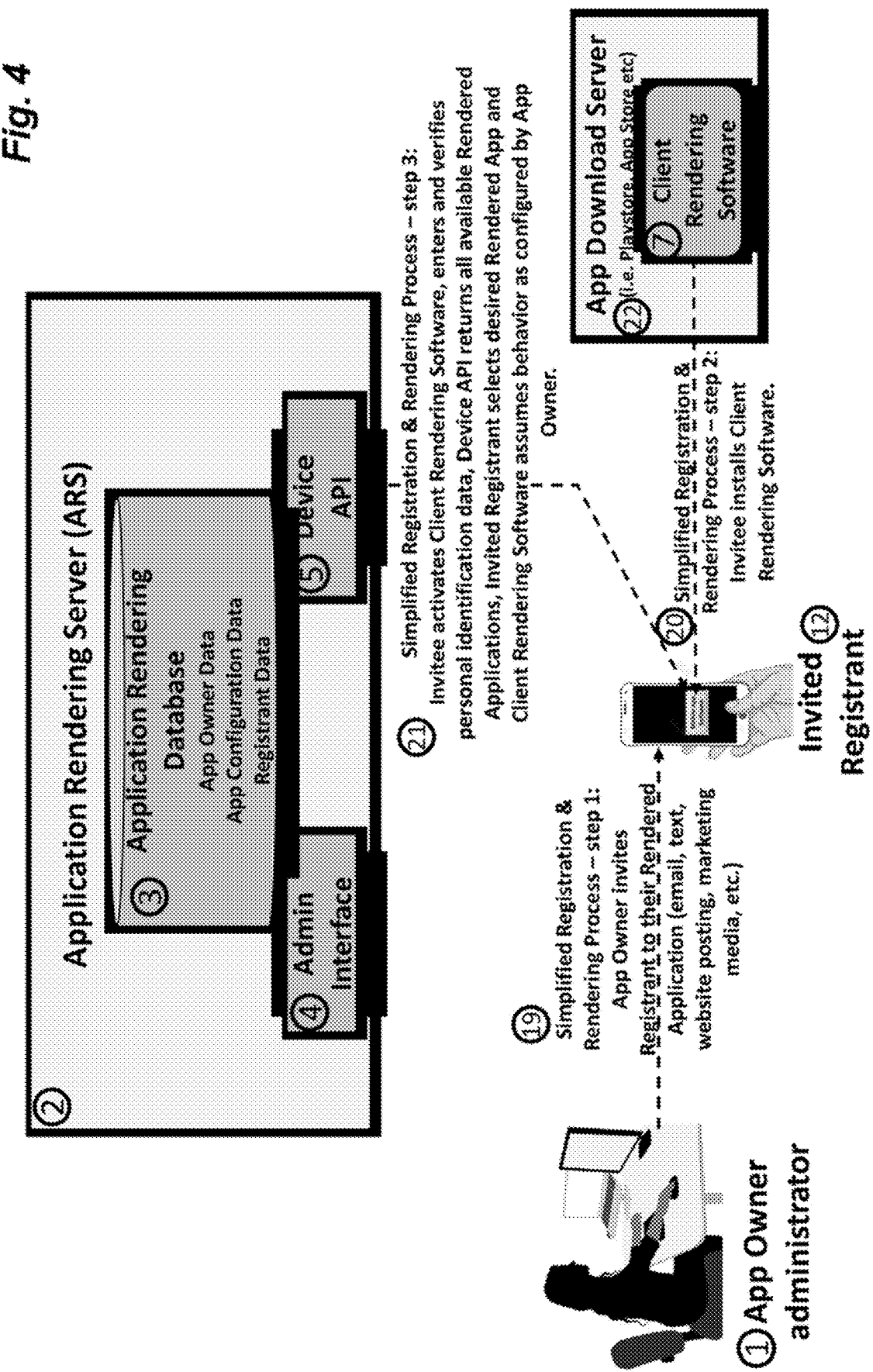
FIG. 4 is a schematic of a Simple Process of Registration & Application Rendering of an Application Rendering Platform based on Registrant Selection, according to one embodiment.

Simplified Application Registration and Rendering Process Based on Registrant Selection (FIG. 4):

Referring now to FIG. 4, according to one embodiment, a simplified process is described by which the Application Rendering Software 7 is installed or otherwise accessible and executable on the Device 6 (FIG. 1) of an invited Registrant 12 assumes the Behavior Set configured by the inviting App Owner 1 using a method whereby the invited Registrant 12 selects the inviting App Owner's 1 Rendered Application from a list of available Rendered Applications presented by the Application Rendering Software 7. (With this simplified process the Invited Registrant 12 selects the Rendered Application to which they have been invited from a list of such Rendered Applications provided by the ARS whereas in the registration processes defined above and in FIGS. 2 & 3 the Invited Registrant 12 does not need to make such a selection).

In one aspect, a Simplified Application Registration and Rendering Process includes a first step 19: The App Owner Administrator 1, invites their registrant (one or many) to register with their Rendered Application. The invitation they provide can include instructions to download the Application Rendering Software 7, and/or instructions to select their Rendered Application by name and includes any security information such as an access code or similar authorization key. This invitation may be communicated by any available method including, but not limited to, email, SMS text, social media posting, advertisement, newsletter, web posting or similar.

In one aspect, a Simplified Application Registration and Rendering Process includes or enables a second step 20: The Invited Registrant 12 follows instructions provided by the App Owner 1 in their communicated invitation as described in FIG. 3, first step 19 above. The invitation communication can instruct the Invited Registrant 12 to download and install the Application Rendering Software 7 from the App Download Server 22. Such a process of downloading and installing software on a device has many forms and is well known to end users and engineers skilled in the various relevant arts and is therefore not described further in this disclosure document.

In one aspect, a Simplified Application Registration and Rendering Process includes a third step 21: Once the invited Registrant 12 has installed the Client Rendering Software 7 they can activate the Rendered Application on their device. Once activated the Client Rendering Software 7 requires the Invited Registrant 12 to provide a set of identification data (for example, but not limited to, name, phone number and/or email address). The Client Rendering Software 7, once appropriate verification is complete (which verification is well understood by individuals skilled in the relevant are and might include a 'One Time Password' method for example), queries the ARS 2 via the API 5 for all available Rendered Applications with which an invited Registrant 12 may register. Once this list is returned, the Client Rendering Software 7 presents the list of available Rendered Applications to the Invited Registrant 12 in a searchable format with an instruction such as, but not limited to, the following: "Please select who invited you" or "Please select the Application with which you wish to register" or "Please select the Application you wish to install". The Invited Registrant 12, following instructions provided by the App Owner 1 in their invitation communication selects the Rendered Application with which they wish to register. Once the Application is selected the Client Rendering Software 7 running on the Invited Registrant's 12 Device 6 adopts the Behavior Set as established by the App Owner 1.

The described Application Rendering Process (ARP) and related methods may provide the following features or benefits. The ARP allows an entity or individual to establish a custom branded software application to be used by, and on the devices of, their target registrant community without the need either to generate any unique software or to establish a developer relationship with the device operating system owners.

The ARP allows an entity or individual, through an administrative interface, to define the behavior a software application will manifest when used by individuals who have registered with them as opposed to any behavior it may manifest when used by individuals who have not registered with them.

The ARP can cause one general purpose application to embody the requirements of a multiplicity of independent and separate applications. The ARP can cause one general purpose application accessing the behavior requirements of a multiplicity of independent and separate applications presents those Rendered application behaviors in the form of an application folder on the device of the end-user. Thereby allowing the end-user to select the behavior sets they wish their general purpose application to manifest.

The ARP allows an individual with a standard computing device to access and use a custom software application without the need to download dedicated software or install that dedicated software on their computing device, by performing a method comprising: installing client software on the device; receiving a first set of application behaviors from a server computing system; executing the client software to implement the specified set of application behaviors; receiving a second set of application behaviors from the server computing system; and executing, without installing additional client software, the second set of application behaviors from the server computing system.

The ARP allows an entity or individual, to promote their custom application to prospective users in such a way that those prospective users, deciding to accept the offer, do not have to select the application owner or specifically select their application from any other owner or application.

The ARP allows an entity or individual, through an API offered by the application Rendering platform described within this patent application to remotely control an unlimited number of application behaviors on the devices of their registered users.

The ARP offers an entity or individual, through an API offered by the application Rendering platform described within this patent application, to upload an image such that the Application Badge, displayed for the Client Rendered Application, takes on the image desired by the Rendered Application Owner on the Devices of their registrant community only.

Figure 5:
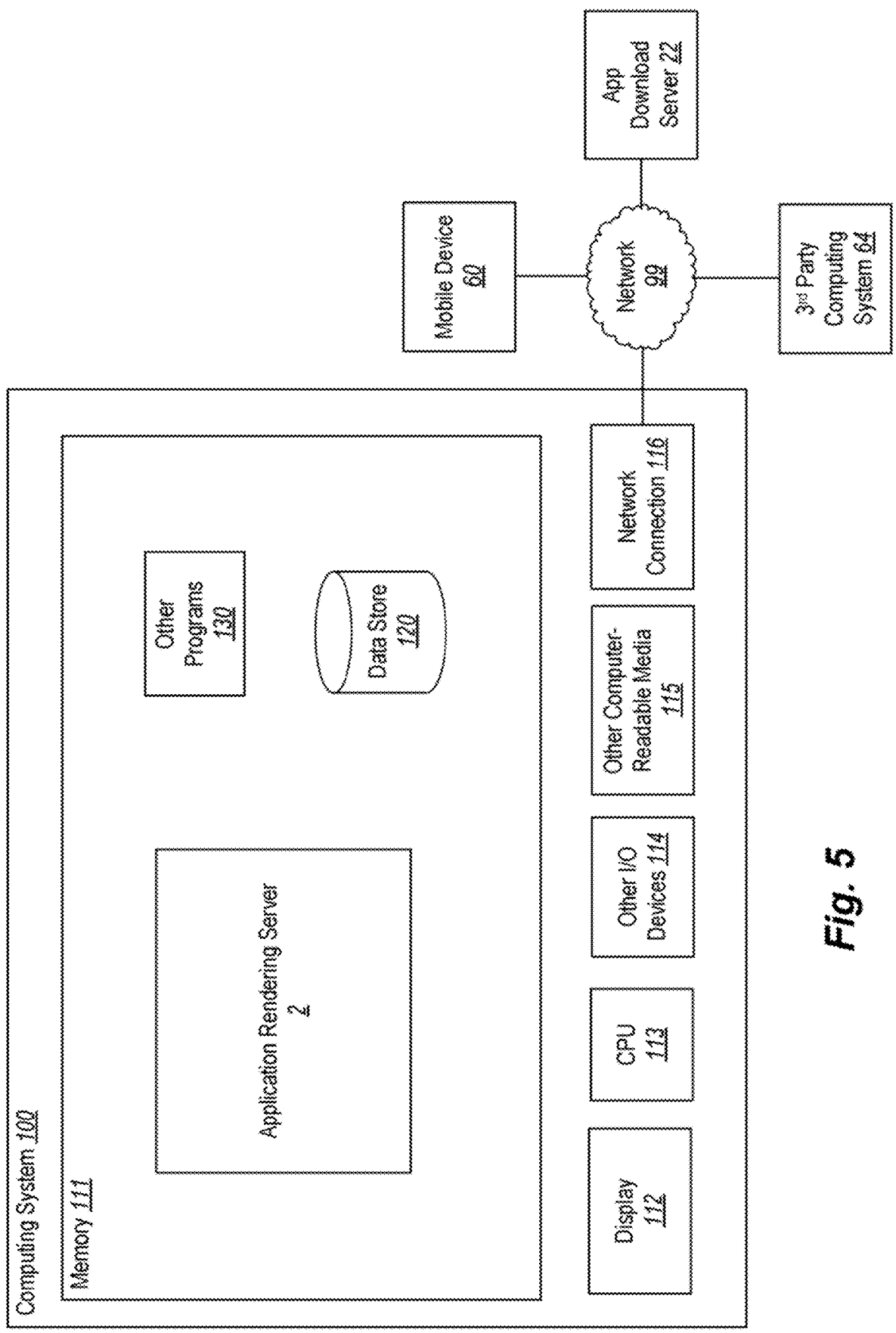
FIG. 5 is a block diagram of a computing system for implementing an Application Rendering Platform according to an example embodiment.

FIG. 5 is a block diagram of a computing system for implementing an Application Rendering Platform according to an example embodiment. In particular, FIG. 5 shows a computing system 100 that executes the application rendering server 2 described above.

The computing system 100 may comprise one or more computing systems and may span distributed locations. In addition, each block shown may represent one or more such blocks as appropriate to a specific embodiment or may be combined with other blocks. Moreover, the various blocks may physically reside on one or more machines, which use standard remote procedure call (e.g., RPC) or proprietary inter-process communication mechanisms (IPC) to communicate with each other.

In the embodiment shown, computing system 100 comprises a computer memory ("memory") 111, a display 112, one or more Central Processing Units ("CPU") 113, Input/Output devices 114 (e.g., keyboard, mouse, CRT or LCD display, and the like), other computer-readable media 115, and a network connection 116. The server 2 is shown residing in memory 111. In other embodiments, some portion of the contents, some or all of the components of the server 2 may be stored on and/or transmitted over the other computer-readable media 115.

The server 2 preferably executes on one or more CPUs 113 and performs the techniques described herein. Other code or programs 130 (e.g., an administrative interface, a Web server, and the like) and potentially other data repositories, such as data repository 120, also reside in the memory 111, and preferably execute on one or more CPUs 113. Of note, one or more of the components in FIG. 5 may not be present in any specific implementation. For example, some embodiments may not provide other computer readable media 115 or a display 112.

The server 2 may interact using network connection 116 via a network 99 with other devices/systems including computing systems/devices 22, 60, and 64. The network 99 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. Computing systems 22, 60, and 64 may be constituted similarly to system 100.

Note that one or more general purpose or special purpose computing systems/devices may be used to implement and/or execute the server 2. However, just because it is possible to implement the server 2 on a general-purpose computing system does not mean that the techniques themselves or the operations (taken alone or in combination) required to implement the techniques are conventional or well known. The techniques are not conventional at least because they address and improve an existing technology, such as by improving the operation, integration, or efficiency of one or more computing systems.

In an example embodiment, components/modules of the server 2 are implemented using software programming techniques. For example, the server 2 may be implemented as a "native" executable running on the CPU 113, along with one or more static or dynamic libraries. In other embodiments, the server 2 may be implemented as instructions processed by a virtual machine that executes as one of the other programs 130.

The various components may be implemented using more monolithic programming techniques, for example, as an executable running on a single CPU computer system, or alternatively decomposed using a variety of structuring techniques, including but not limited to, multiprogramming, multithreading, client-server, or peer-to-peer, running on one or more computer systems each having one or more CPUs. Some embodiments may execute concurrently and asynchronously, and communicate using message passing, remote procedure call, or other distributed computing paradigms. Equivalent synchronous embodiments are also supported. Also, other functions could be implemented and/or performed by each component/module, and in different orders, and by different components/modules, yet still achieve the described functions.

In addition, programming interfaces to the data stored as part of the server 2, such as in the data store 120, can be available by language-specific APIs; libraries for accessing files, databases, or other data repositories; through representational languages such as XML; or through Web servers, FTP servers, or other types of servers providing access to stored data. The data store 120 may be implemented as one or more database systems, file systems, or any other technique for storing such information, or any combination of the above, including implementations using distributed computing techniques.

Furthermore, in some embodiments, some or all of the components of the server 2 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

The various embodiments described above can be combined to provide further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system comprising:
 a server computing system including:
  an Application Rendering Database that stores owner data, application configuration data, and registrant data;
  an administrative interface module configured to specify a set of application behaviors stored as configuration data in the Application Rendering Database;
  a registration server configured to register an invited registrant user who operates a client device; and
  a device Application Programming Interface ("API") configured to transmit to client rendering software on the client device configuration data including the specified set of application behaviors, thereby causing the client rendering software on the client device to implement the specified set of application behaviors as configured via the administrative interface module,
 wherein an Application Owner receives a unique invitation ("Uniform Resource Locator") URL or scannable code from the server computing system to invite prospective community of registrant app users;
 wherein a prospective registrant user when activating the invitation URL or scannable code is presented with a custom registration form that collects identification data from the registrant user;
 wherein the registration server, once registrant data entry is complete, stores all collected registration data with a unique registration reference key;
 wherein the registration server, once registrant data entry is complete, transmits a dynamic link via an SMS ("Short Message Service") text message to a smartphone number entered by the registrant user that directs the client device to a correct download server to install the client rendering software; and wherein the SMS text message transmitted by the registration server includes the unique registration reference key such that the client rendering software, upon initial instantiation, accesses that unique registration reference key and, by exchanging the key with the registration server receives all application configuration data and registrant identification data required to immediately, without any further registrant user interaction, manifest the set of application behaviors configured by the Application Owner.

2. The system of claim 1,
wherein the administrative interface module provides a first Uniform Resource Locator ("URL") that generates a registration form specific to a specified set of application behaviors;
wherein the invited registrant user activates the first URL to access the registration server to:
register the invited registrant user by collecting registrant identification data from the invited individual and providing said registrant identification data to the registration server; and
after registration is complete, the invited individual receives from the registration server a second URL that references an app download server that is configured to:
receive, based on the second URL, the client rendering software from the app download server; and
install the client rendering software on the client device;
wherein the device API is configured to:
receive registrant identification from the client device;
validate the registrant identification; and
transmit the configuration data, for which the first URL was specific, to the client device, thereby causing the client rendering software on the client device to implement the specified set of behaviors.

3. The system of claim 1,
wherein the client device is configured to:
receive an invitation to install the client rendering software;
receive, based on the invitation, the client rendering software from an app download server; and
install the client rendering software on the client device;
wherein the device API is configured to:
receive registrant identification from the client device;
validate the registrant identification; and
transmit configuration data including multiple sets of behaviors to the client device, each set of behaviors defining a different Rendered application,
wherein the client device is further configured to:
receive from the registrant user a selection of one of the multiple sets of behaviors; and
implement the selected set of behavior.

4. The system of claim 1, further comprising:
a first mobile device storing the client rendering software and a first configuration data, wherein the first mobile device is operated by a user that is part of a first registrant community; and
a second mobile device storing the client rendering software and a second configuration data, wherein the second mobile device is operated by a user that is part of a second registrant community, wherein the first and second registrant community are not the same, wherein the first and second configuration data are not the same, and wherein the client rendering software on the first device manifests a behavior set that is different from that of the client rendering software on the second device.

5. The system of claim 4,
wherein the administrative interface module is configured to:
receive a first image associated with the first registrant community; and
transmit the first image to the first mobile device;
wherein the administrative interface module is configured to:
receive a second image associated with the second registrant community; and
transmit the second image to the second mobile device;
wherein the first mobile device lists the client rendering software alongside other applications within its application display using a first application badge that is based on the first image;
wherein the second mobile device lists the client rendering software alongside other applications within its application display using a second application badge that is based on the second image, wherein the first and second application badge are not the same.

6. The system of claim 1, further comprising:
a mobile device that is configured to:
install client rendering software on the mobile device;
receive a first set of application behaviors from the device API;
execute the client rendering software to implement the first set of application behaviors;
receive a second set of application behaviors from the device API; and
execute, without installing additional software, the second set of application behaviors.

7. A method comprising:
by an application rendering server,
providing an invitation registration form via a first Uniform Resource Locator ("URL") that is associated with a specific set of application behaviors;
receiving, from a client device and based on the first URL, registrant information;
transmitting to the client device a second URL that is based on the registrant information and that references an app download server, thereby causing the client device to download and install client rendering software obtained from the app download server;
receiving, from the client device, registrant identification; and
transmitting to the client device configuration data that is based on the registrant identification and that includes multiple sets of application behaviors to the client device, each set of application behaviors defining a different rendered application to execute on the client device,
wherein transmission of the second URL is accomplished via a Short Message Service ("SMS") text message to the client device, thereby:
directing the client device to the app download server to download and install the client rendering software and
validating a phone number entered by an invited registrant user,
wherein the SMS message includes a unique registration reference key such that the client rendering software, upon initial instantiation, accesses the unique registration reference key and, by exchanging the key with an application rendering server, receives all application configuration data and registrant identification data required to immediately, without any further registrant user interaction, manifest the application behaviors configured by an application owner.

8. The method of claim 7, wherein the first URL is encoded within a machine-readable code.

9. The method of claim 7, further comprising:
receiving registrant data from the invited registrant user;
generating the unique registration reference key; and
storing the unique registration reference key in association with the registrant data.

10. A non-transitory computer-readable storage medium that stores instructions that are configured, when executed by an application rendering server computer system, to perform a method comprising:
providing a registration form via a first Uniform Resource Locator ("URL") that is associated with a specified set of application behaviors;
receiving, from an invited registrant user based on the first URL, registrant information data;
transmitting to a client device a second URL that is based on the registrant information data and that references an app download server, thereby causing the client device to download and install client rendering software obtained from the app download server;
receiving, from the client device, registrant identification; and
transmitting to the client device configuration data that is based on the registrant identification and that includes multiple sets of application behaviors to the client device, each set of behaviors defining a different rendered application to execute on the client device,
wherein transmitting the second URL includes transmitting an SMS text message to the client device, thereby directing the client device to the app download server to download and install the client rendering software,
wherein the Short Message Service ("SMS") message includes a unique registration reference key such that the client rendering software, upon initial instantiation, accesses that unique registration reference key and, by exchanging the key with an application rendering server, receives all application configuration data and registrant identification data required to immediately, without any further registrant user interaction, manifest the application behaviors configured by an application owner.

11. The computer-readable storage medium of claim 10, wherein the first URL is encoded within a machine-readable code.

12. The computer-readable storage medium of claim 10, the method further comprising:
receiving registrant data from the invited registrant user;
generating the unique registration reference key; and
storing the unique registration reference key in association with the registrant data.

* * * * *